UNITED STATES PATENT OFFICE.

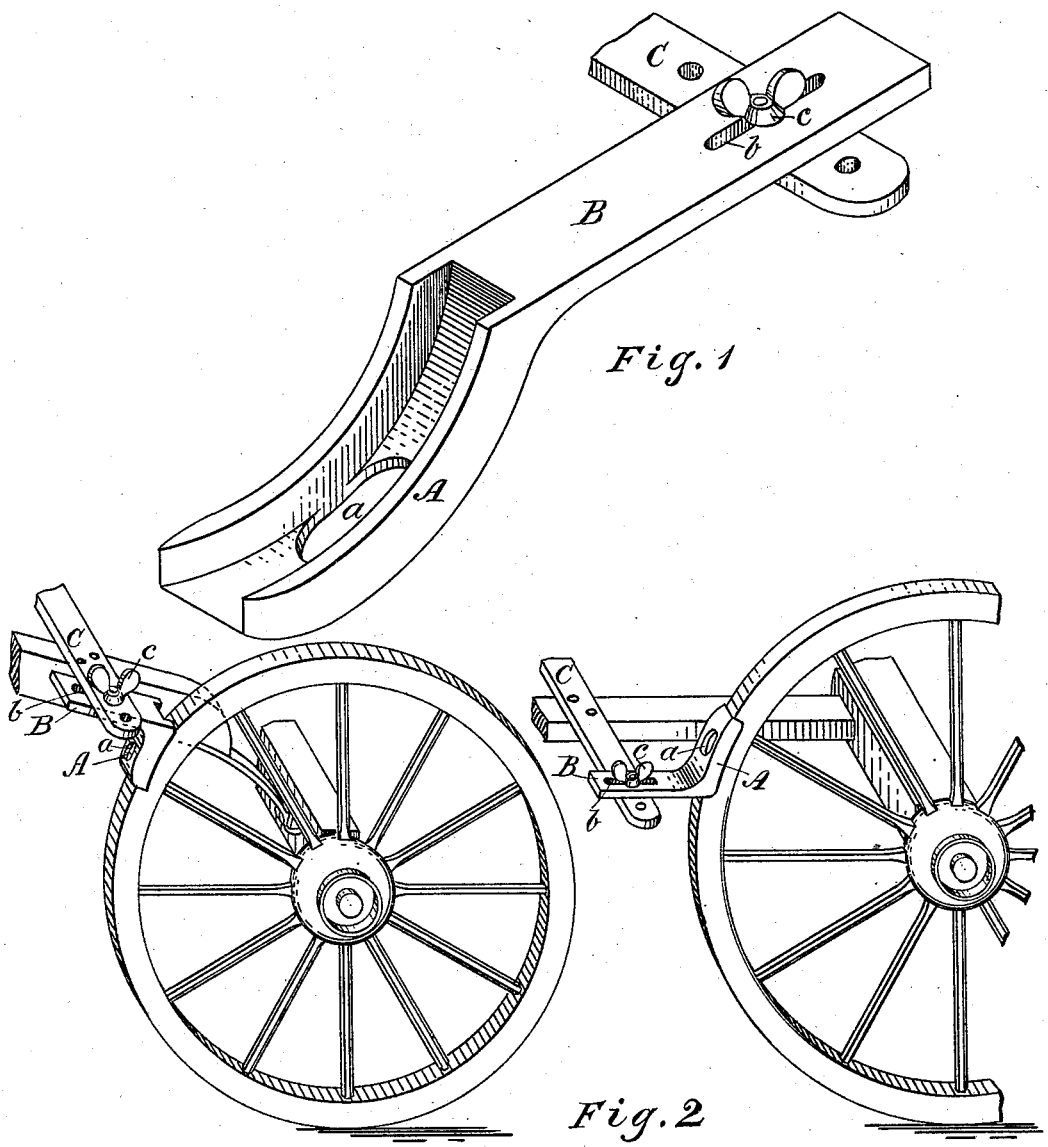

FREDERICK C. MERCER, OF WINNIPEG, MANITOBA, CANADA.

VEHICLE-WHEEL SCRAPER.

SPECIFICATION forming part of Letters Patent No. 255,444, dated March 28, 1882.

Application filed January 13, 1882. (Model.)

*To all whom it may concern:*

Be it known that I, FREDERICK CLARKE MERCER, a citizen of Canada, residing at Winnipeg, in the county of Selkirk and Province of Manitoba, Canada, have invented a new and Improved Vehicle-Wheel Scraper; and I do hereby declare that the following is a full, clear, and exact description of the same.

My invention consists in the attachment for carriages and other wheeled vehicles which is shown in the annexed drawings, and the object of which is the removal of the mud or clay that may adhere to and clog the wheels when passing over soft and clayey roads. The inconvenience and disadvantage occasioned by the wheels becoming thus clogged is sometimes serious, as not only may valuable property be injured, but the draft of the vehicle is thereby greatly increased. These difficulties I claim are wholely obviated by the use of my wheel-scraper, which I will now illustrate and describe, so that others skilled in the art to which it appertains will understand and be able to make and use the same.

In the annexed drawings, Figure 1 is a detached perspective view of my scraper. Fig. 2 represents the scraper as applied to a carriage or wagon.

The part of the scraper marked A has a rectangular channel or groove, the width of which being such as will span the width of the wheel felly or tire loosely. Lengthwise it is bent or formed in the shape of a segment.

A is a perforation made in the bottom of the channel at a short distance from its outer end. The object of this opening will be explained farther on.

B is a shank or extension of the channel A, and has formed in it a slot, *b*, through which a set-screw, *c*, passes, by which the scraper is secured to a sustaining-bar, C, which is in turn attached to the shaft or to the frame-work or body of the carriage or wagon in any approved manner. The length of the slot *b*, together with the set-screw *c*, allows the distance between the scraper and the periphery of the wheel to be varied as may be desired, or one scraper may be removed and replaced by another without any material trouble or loss of time.

This scraper being placed in position, the sides of the channel cover the sides of the tire or felly of the wheel, and the bottom covers the face or periphery of the tire. The outer ends of the bottom and sides of the channel, being made somewhat sharp or "chisel-edged," will shave the mud or clay off the wheel as it is carried against them by the rotation of the wheel.

The object of the opening *a* in the bottom of the channel, above referred to, is to allow of the escape of any clay or mud through it that may be drawn into the channel by reason of the scraper not being set close enough to the wheel.

What I claim as my invention, and desire to secure by Letters Patent, is—

A mud or clay scraper for vehicle-wheels, composed of the segmental and rectangular-shaped channel A, having the opening *a*, the shank B, having formed in it the slot *b*, the set-screw *c*, and the sustaining-bar C, substantially as shown and described, and for the purpose set forth.

FREDERICK CLARKE MERCER.

Witnesses:
L. J. COURSOLLES,
Ls. E. NOÉL.